United States Patent
Walser et al.

(10) Patent No.: US 12,059,921 B2
(45) Date of Patent: Aug. 13, 2024

(54) WHEEL RIM WITH OPTIMIZED SHAPE OF RIM FLANGE

(71) Applicant: Maxion Wheels Holding GmbH, Königswinter (DE)

(72) Inventors: Daniel Walser, Clermont-Ferrand (FR); Bertrand Vedy, Clermont-Ferrand (FR)

(73) Assignee: Maxion Wheels Holding GmbH, Königswinter (DE)

( * ) Notice: Subject to any disclaimer, the term of this patent is extended or adjusted under 35 U.S.C. 154(b) by 0 days.

(21) Appl. No.: 16/626,140

(22) PCT Filed: Jun. 29, 2018

(86) PCT No.: PCT/FR2018/051612
§ 371 (c)(1),
(2) Date: Dec. 23, 2019

(87) PCT Pub. No.: WO2019/002793
PCT Pub. Date: Jan. 3, 2019

(65) Prior Publication Data
US 2020/0139757 A1 May 7, 2020

(30) Foreign Application Priority Data

Jun. 30, 2017 (FR) .................................... 1756176
Jun. 8, 2018 (FR) .................................... 1855036

(51) Int. Cl.
*B60B 25/04* (2006.01)
*B60B 25/08* (2006.01)
(Continued)

(52) U.S. Cl.
CPC ............ *B60B 25/045* (2013.01); *B60B 25/08* (2013.01); *B60B 25/12* (2013.01); *B60C 15/0223* (2013.01); *B60B 2900/351* (2013.01)

(58) Field of Classification Search
CPC ..... B60C 15/0223; B60B 21/10; B60B 21/04; B60B 2900/351; B60B 25/045; B60B 25/08; B60B 25/12
See application file for complete search history.

(56) References Cited

U.S. PATENT DOCUMENTS 2,164,984 A  7/1939 Brink
3,143,157 A  8/1964 Robson et al.
(Continued)

FOREIGN PATENT DOCUMENTS

DE  2514883 A * 10/1976 ............. B60B 21/10
EP  0 125 047 A1  11/1984
(Continued)

OTHER PUBLICATIONS

International Search Report dated Oct. 24, 2018, in corresponding PCT/FR2018/051612 (4 pages).

*Primary Examiner* — Scott A Browne
(74) *Attorney, Agent, or Firm* — MacMillan, Sobanski & Todd, LLC

(57) ABSTRACT

A rim (3) for a tire has an axis of rotation DD' and a rim seat (31) extended axially towards the outside by a rim flange (32), said rim flange (32) having a first portion (321) that is oriented substantially in a perpendicular plane and is situated radially on the outside with respect to said rim seat (31), characterized in that said rim flange (32) has a second portion (322) that is inclined towards the outside, is situated axially on the outside with respect to said first portion (321) and is situated at least partially radially on the outside with respect to said rim seat (31), said rim having a connecting portion (320) between said first portion (321) and said second portion (322).

5 Claims, 3 Drawing Sheets

(51) Int. Cl.
  *B60B 25/12* (2006.01)
  *B60C 15/02* (2006.01)

(56) References Cited

U.S. PATENT DOCUMENTS

| | | | |
|---|---|---|---|
| 3,915,215 A * | 10/1975 | Nebout | B60C 15/024 |
| | | | 152/381.4 |
| 4,274,466 A | 6/1981 | French et al. | |
| 4,351,382 A | 9/1982 | Corner et al. | |
| 4,658,876 A | 4/1987 | Augier | |
| 4,878,527 A * | 11/1989 | Noma | B60B 21/10 |
| | | | 152/379.3 |
| 5,232,034 A | 8/1993 | Gergele | |
| 5,636,673 A * | 6/1997 | Augier | B60C 5/16 |
| | | | 152/379.3 |
| 5,749,982 A | 5/1998 | Muhlhoff et al. | |
| 5,837,073 A | 11/1998 | Cauquot et al. | |
| 6,609,549 B2 | 8/2003 | Abinal et al. | |
| 6,626,217 B2 | 9/2003 | Bestgen | |
| 10,328,752 B2 | 6/2019 | Topin et al. | |
| 10,414,208 B2 | 9/2019 | Merino Lopez | |
| 10,562,348 B2 | 2/2020 | Ahouanto et al. | |
| 2002/0124923 A1 | 9/2002 | Abinal et al. | |
| 2016/0144660 A1 | 5/2016 | Mercat et al. | |
| 2016/0311255 A1 | 10/2016 | Ahouanto et al. | |
| 2017/0001472 A1 | 1/2017 | Ahouanto et al. | |
| 2017/0291457 A1 | 10/2017 | Topin et al. | |
| 2018/0037061 A1 | 2/2018 | Merino Lopez | |
| 2019/0299705 A1 | 10/2019 | Walser | |
| 2019/0299721 A1 | 10/2019 | Baumgartner et al. | |
| 2020/0215850 A1 | 7/2020 | Walser et al. | |
| 2020/0215851 A1 | 7/2020 | Walser et al. | |

FOREIGN PATENT DOCUMENTS

| | | | |
|---|---|---|---|
| EP | 0 493 569 B1 | 7/1992 | |
| EP | 0 733 000 B1 | 9/1996 | |
| EP | 0 783 981 A1 | 7/1997 | |
| EP | 1 216 850 A1 | 6/2002 | |
| FR | 3014362 A1 * | 6/2015 | B60B 25/18 |
| FR | 3020313 A1 | 10/2015 | |
| WO | 2009/049762 A1 | 4/2009 | |
| WO | 2015/086662 A1 | 6/2015 | |
| WO | WO-2015086662 A1 * | 6/2015 | B60B 25/18 |
| WO | 2016/046197 A1 | 3/2016 | |
| WO | 2016/046201 A1 | 3/2016 | |
| WO | 2016/124366 A1 | 8/2016 | |
| WO | 2018/007751 A1 | 1/2018 | |

\* cited by examiner

WHEEL RIM WITH OPTIMIZED SHAPE OF RIM FLANGE

FIELD OF THE INVENTION

The subject of the invention is a rolling assembly made up of a tyre, a rigid rim and a connection between the tyre and rim via a flexible extender. As is known, a tyre comprises two beads intended to be mounted on seats. The present invention relates to rolling assemblies in which a tyre bead is not mounted directly on a rigid rim but is mounted on a flexible extender, which is mounted on the rim.

A tyre, a rim, and an extender, as discussed in the present invention, are usually described by a representation in a median plane, i.e. a plane containing the axis of rotation of the tyre. All of these products (a tyre, a rim, an extender) are objects having geometry of revolution about their axis of rotation. The radial and axial directions denote the directions perpendicular to the axis of rotation of the tyre and parallel to the axis of rotation of the tyre, respectively. In the following text, the expressions "radially" and "axially" mean "in a radial direction", and "in the axial direction", respectively. The expressions "radially on the inside" and "radially on the outside" mean "closer to" and "further away from the axis of rotation of the tyre, in a radial direction", respectively. A median plane is a plane perpendicular to the axis of rotation of the tyre, positioned axially so as to intersect the surface of the tread substantially midway between the beads of a tyre. The expressions "axially on the inside" and "axially on the outside" mean "closer to" and "further away from the median plane of the tyre, in the axial direction", respectively. The expressions "radially on the inside" and "radially on the outside" mean "closer to" and "further away from the axis of rotation of the tyre, in the radial direction", respectively. Finally, it will also be recalled that a "radial cross section" or "radial section" means a cross section or a section in a plane that contains the axis of rotation of the rim (and of the tyre with which the latter is equipped).

PRIOR ART

The U.S. Pat. No. 4,274,466 presents a tyre and wheel assembly having a circumferential groove in the seat of the rim that cooperates with a rubber tip of the end of the bead of the tyre in order to lock the bead in position on the rim.

The document WO2016/046197 proposes inserting a flexible extender between a tyre bead and a rim. The reader may refer for example to FIG. 5 of that document in order to acquaint himself with a rolling assembly belonging to the field of the invention.

Therein he will see a rolling assembly comprising a tyre, a rim and two identical extenders. Considering the language conventions recalled above, and with reference to the way in which such an extender is mounted on a rim, such an extender comprises, axially from the inside to the outside, an axially inner end, referred to as extender bead, intended to secure the extender to the rim. Such an extender also comprises an axially outer end intended to receive a tyre bead and axially fix it in place. A body connects the axially inner end and the axially outer end.

The extenders are mounted on a rim, which is an aluminium part most of the time. On each side, the rim has a rim flange intended in particular to axially fix the extender in place. Another function of this rim flange is to cause the extender to deform so as to form a boss (usually known, for rims, as a "hump") that the tyre crosses when inflated (as for a conventional tyre and rim assembly, without an extender). This boss helps to prevent or delay the unseating of the tyre if it is used at an abnormally low inflation pressure (it being known that, in the event of unseating, the guiding capacity of the tyre is very greatly reduced and even disappears if the tyre comes off the rim, this becoming very probable).

The radial height of this rim flange, for rolling assemblies having an extender, had been chosen during exploratory work by adopting a "B" type flange as described by the ETRTO (height 14.1 mm+/−0.6), whereas the flanges for passenger vehicle tyres are usually of the "J" type (height 17.3 mm+/−0.6). Although such a B flange, referred to as high flange in the present document, has the advantage of contributing towards good unseating values of usual tyre/rim assemblies (under low pressure), in the context of mounting with extenders, it also causes problems.

Firstly, the hump is large enough to result in inflation pressure values that are too high for the simple fitting of the tyre mounted on the rim with extenders. Secondly, this flange causes the extender to deform greatly at the location at which it radially overhangs the latter. Specifically, the natural shape of the extender on exiting the mould, in the entirely stress-free state, is approximately cylindrical (in fact very slightly conical), with a diameter much smaller than the diameter measured at the vertex of the metal flange. The fitting of the extender thus brings about a large local radial deformation of the extender. Since, at this location, the reinforcers within the extender are generally of the "cross-ply" type, the extender sets a high resistance against this deformation. This results in a high pressure between the extender and the metal flange at the location of the boss comparable with a conventional rim hump.

On account of the good adhesion between the rubber and the aluminium, it will be readily understood that some of the axial load that is generated by the tyre under pressure and tends to axially stretch the extender is partially reacted at this interface, whereas it would be preferred, in order to ensure isostatic mounting of the extender, for all of this load to be reacted by the heel of the extender bearing against the metal flange. As things stand, the fact that the positioning of the extender is not clearly defined because it is not necessarily fitted identically around its entire perimeter causes geometric irregularities, which are themselves responsible for vibrations during rolling on account of non-uniformities.

The observations made by the applicant have thus led to a departure from the usual construction rules for rims.

BRIEF DESCRIPTION OF THE INVENTION

This objective has been achieved, surprisingly, by departing from the prior teachings, as regards the design of the rim, and more particularly of the flange thereof.

Therefore, the subject of the invention is a rim for a tyre, the rim having an axis of rotation DD', said rim having a rim seat extended axially towards the outside by a rim flange, said rim flange having a radially outer bearing face with a first portion that is oriented substantially in a perpendicular plane and is situated radially on the outside with respect to said rim seat, a second portion that is inclined towards the outside, is situated axially on the outside with respect to said first portion and is situated at least partially radially on the outside with respect to said rim seat and a connecting portion between said first portion and said second portion. This rim is characterized in that said second portion of said bearing face is substantially frustoconical, the virtual vertex determined by continuing said substantially frustoconical portion being situated axially towards the outside with respect to said rim seat.

In fact, the invention proposes a rim of which the flange, of significant width, has a shape designed to give the radially inner face of the extender a bearing face or support of appropriate shape for said extender, in the tyre assembly inflated to nominal pressure, to deform and adopt a shape favouring proper functioning.

Advantageously, said second, substantially frustoconical portion forms an angle $\alpha$ with a value of between 5° and 30° with the axis of rotation DD'. Preferably, the cumulative axial width of the second portion and the connecting portion is between 15 mm and 21.5 mm.

According to the prior art, the extenders mounted on a metal rim form in fact the seat of the tyre, as regards the capacity thereof to radially absorb impacts. They confer greater radial flexibility on the rolling assembly. Whereas it used to be thought that it was not possible to make a significant improvement to this capacity to absorb impacts if the bead of the tyre is not entirely axially on the outside of the rim, it has been found that it is possible to maintain a certain radial flexibility combined both with excellent endurance of the extender and an improvement in road holding performance (which is known to be better when the tyre is capable of developing high drift thrusts that are favourable to the strict transverse guidance of the vehicle) by organizing a tilt of the bead of the tyre and also a radial displacement towards the axis of rotation of the rolling assembly. The extension of the radially outer bearing face of the rim flange under the bead of the tyre effectively allows an improvement in the road holding performance of the rolling assembly compared with rolling assembly geometries presented for example in the cited document WO2016/046197.

The invention confers a new function on the rim, namely, on account of the rigid bearing surface present radially under the toe of the bead of the tyre, more or less hugging the shape of the extender, that of affording a rigid support that forces the tyre to begin a tilting motion which does not counter sufficient radial displacement of the bead when the axially outermost part thereof is considered.

Observations have shown that the performance in terms of endurance to radially oriented impacts is comparable to, or even better than, that obtained by applying the teachings of the prior art. Preferably, the rolling assembly has two extenders that provide the connection between the mounting rim and the two beads of the tyre.

Each extender is flexible; this is understood to mean that it is elastically deformable, allowing, as seen in meridian section, bending and radial displacement without leaving the elastic domain, under service stress loadings, during the use of the tyre inflated to nominal pressure. It should be noted that the axial deformation of the extender is not desirable during normal operation of the tyre inflated to nominal pressure.

The rim is preferably made of a material selected from steel or alloys of aluminium and/or of magnesium, composite materials based on carbon fibres, glass fibres, aramid fibres, plant fibres, said fibres being contained in a matrix based on thermosetting compounds or on thermoplastic compounds, or of a complex compound comprising an elastomer and a complex based on resin and fibres selected from carbon fibres, glass fibres, aramid fibres, plant fibres or from any combination of materials.

For further aspects of the rim per se or of the extender per se, the reader is referred to the abovementioned documents WO2015/086662 and WO2016/046197.

DESCRIPTION OF THE FIGURES

The invention is described below with reference to FIGS. 1 to 7, which are given merely by way of illustration.

DETAILED DESCRIPTION OF THE INVENTION

Figure 1:
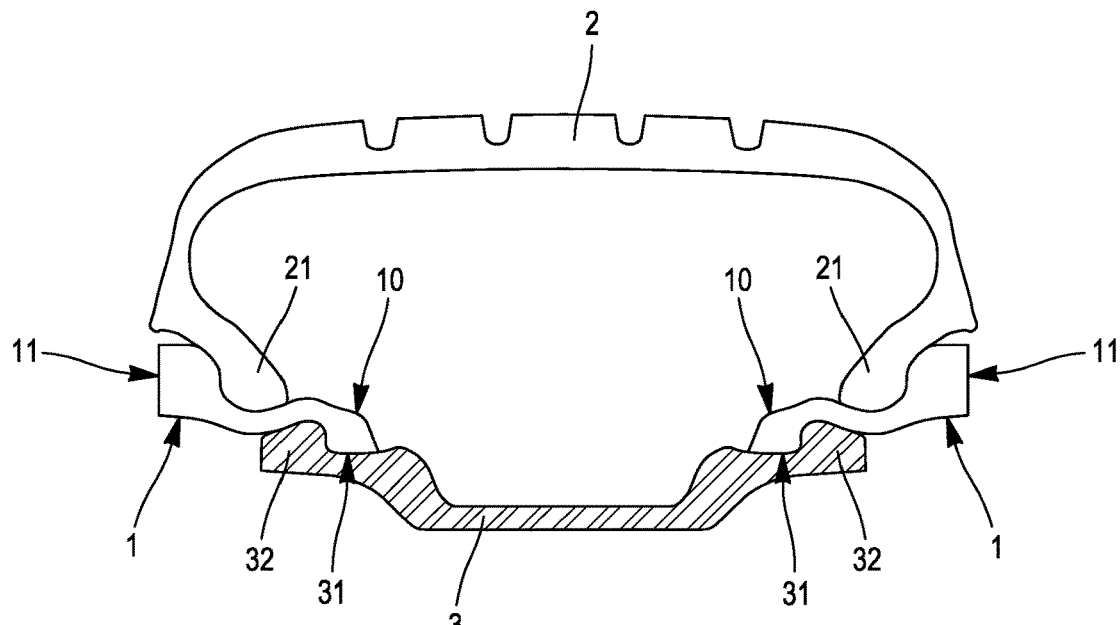
FIG. 1 is a meridian section through a rolling assembly with a rim according to the invention.
Figure 2:
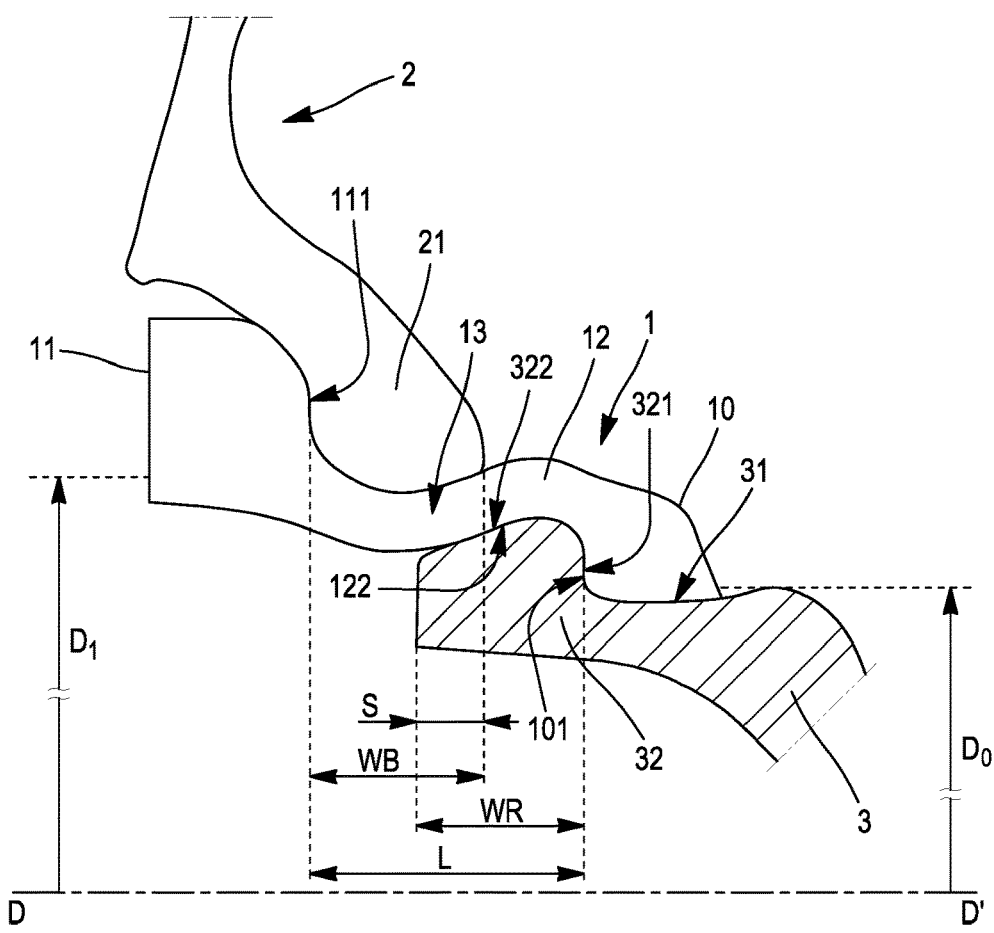
FIG. 2 is an enlargement of the left-hand part of the assembly.

FIG. 1 shows a rolling assembly according to the invention. This assembly comprises two identical extenders 1, a tyre 2 and a rim 3. The tyre 2 has two beads 21. Generally, let it be pointed out that the choice of rim width is such that, given the width L of the extenders (see FIG. 2), the tyre is in a configuration that is as similar as possible to the configuration it would have if it were mounted directly, without extenders, on an appropriate rim.

Figure 3:
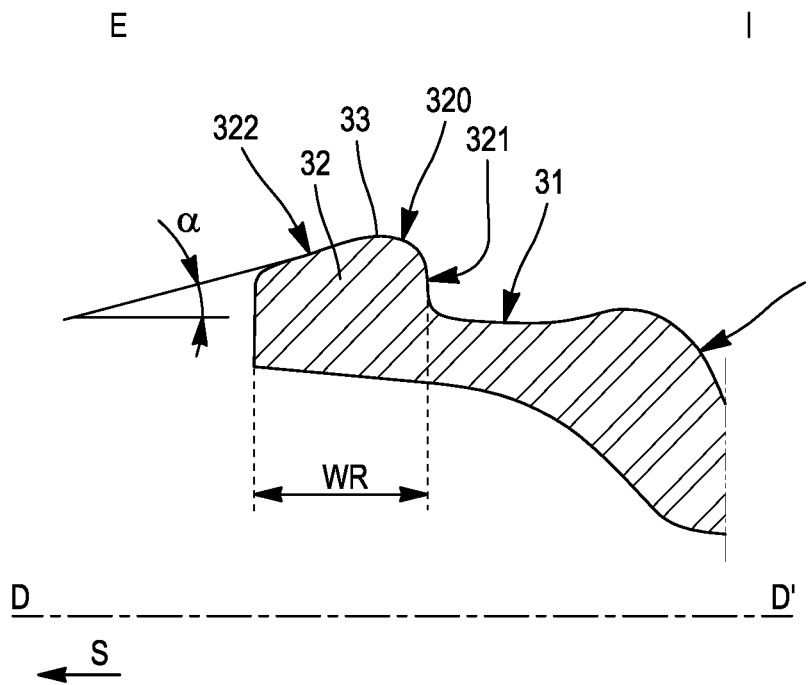
FIG. 3 is a partial meridian section through a rim according to the invention.

By consulting more particularly FIG. 3, it is apparent that the rim 3 has two rim seats 31, each extended by a rim flange 32. The rim flange 32 has a radially outer bearing face 33 intended to act as a support for the extender body. The bearing face 33 of the rim flange 32 is in contact with the extender 1 when the tyre is mounted on the extenders and the latter are mounted on the rim, the tyre being inflated to nominal pressure. This bearing face 33 has a first portion 321 oriented substantially in a plane perpendicular to the axis of rotation DD' of the rolling assembly and situated radially on the outside with respect to said rim seat 31. The bearing face 33 of the rim flange 32 has a second, substantially frustoconical portion 322, which is situated axially on the outside with respect to the said first portion 321 and situated at least in part radially on the outside with respect to said rim seat 31, said second portion 322 being substantially frustoconical, with an angle $\alpha$ of 15°. The bearing face 33 also comprises a connecting portion 320 between said first portion 321 and said second portion 322. In the example shown, the axial width WR of the rim flange 32 is 18.3 mm.

The references E and I in FIG. 3 indicate the axially outer side and the axially inner side of the rim, respectively. The second portion 322 is inclined axially towards the outside: thus, by extending it axially towards the outside, it meets the axis DD' (position not to scale with respect to the rim 3) at a virtual vertex S located axially very far towards the outside, this being symbolized by an arrow under S in FIG. 3.

The invention can be used with numerous variants of internal makeup of the tyre 2, which are not depicted, and with numerous variants of internal makeup of the extender 1, which are not depicted.

Returning to FIG. 2, it is apparent that each extender 1 has an axially inner end intended to be mounted on one of said rim seats 31. It has an axially outer end 11 and a body 12 that is oriented substantially axially and disposed between said axially outer end 11 and said axially inner end 10. The body 12 has a radially inner face 122. The axially inner end 10 of the extender has an axial positioning face 101 substantially perpendicular to the axis of rotation DD' and is fixed in place by being pressed axially against the rim flange 32 under the effect of the inflation pressure of the rolling assembly. The axially outer end 11 has a shoulder 111 forming, in part, a face substantially perpendicular to the axis of rotation DD'. Said extender 1 has an extender seat 13. The bead 21 has an axial width WB at the interface of the bead 21 with the extender seat 13. The bead 21 is fixed in place by being pressed axially against said axially outer end 11 of the extender under the effect of the inflation pressure of the rolling assembly.

Continuing the line of the shoulder 111 of the axially outer end 11 radially towards the inside and continuing the line of the extender seat 13, a point is obtained which is the line of a circle of diameter Di, said diameter itself corresponding to the standardized diameter of the tyre of the rolling assembly using the extender 1 according to the invention. Continuing the line of the axial positioning face 101 radially towards the inside and continuing the line of the rim seat 31, a point is obtained which is the line of a circle of diameter Do, which is the standardized diameter of the rim seat 31. For information about the standards to which reference is made, the reader should consult the documentation of the ETRTO (European Tyre and Rim Technical Organisation). The height h of the rim flange measured between the intersection point between the line of the rim seat 310 and the line of the radial portion 321 of the flange 32 and the radially outermost point F of the flange 32 is 8.5 mm (see FIG. 7). This makes it possible to obtain a boss of the extender that is appropriate for keeping the bead of the tyre on the extender seat without bringing about excessive stresses in the structure of the extender.

Once mounting has been effected, the bead of the tyre causes a circumferential contraction of the extender 1. The rim flange 32 extends axially under the bead 21 by a distance S such that the ratio S/WB is equal to 0.3. Thus, it is apparent that the radially inner face 122 bears on the radially outer bearing face 33 of the rim flange 32 across its entire axial width WR, which is 18.3 mm and is much greater than in known embodiments, thereby forcing the bead 21 of the tyre to tilt in a rotational movement (in the anticlockwise direction for the side of the tyre 2 shown in FIG. 2) when it is subjected to a significant increase in radial load.

Figure 7:
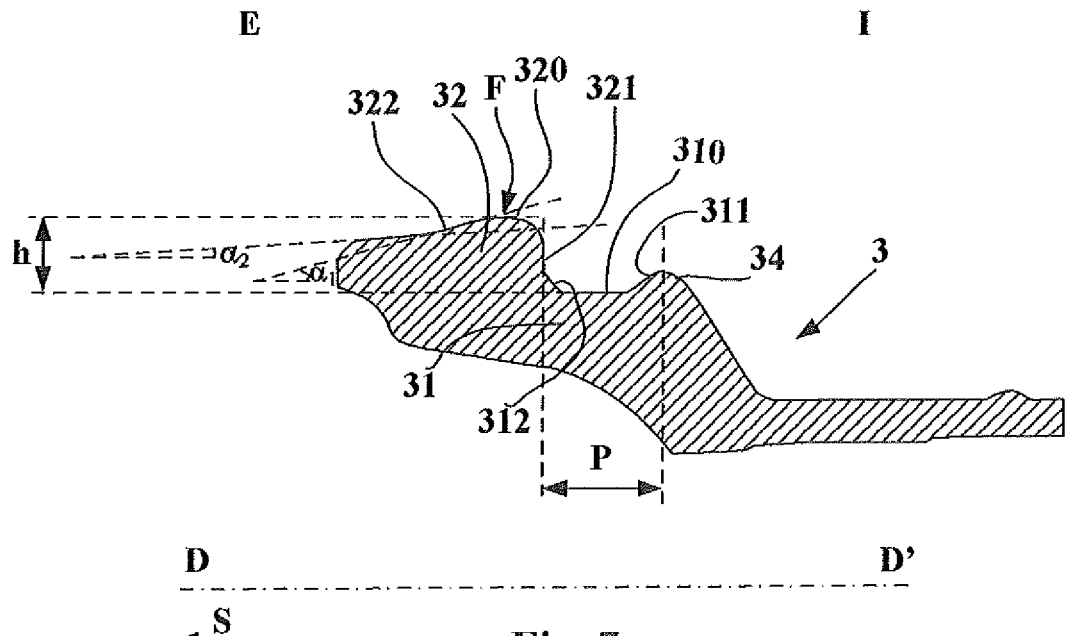
FIG. 7 is a partial meridian section through another embodiment of a rim according to the invention.

FIG. 7 presents a partial meridian section through an alternative embodiment of a rim according to one of the subjects of the invention. The identical references correspond to identical or similar parts.

This rim 3 differs from the one illustrated in FIG. 3 in that it has a rim seat 310 that is substantially cylindrical between two transition zones 311 and 312 and a much smaller axial width P, of around 15.3 mm. These two modifications make it possible to lock the extender bead of the extender 1 in its service position as soon as it is mounted on the rim without having to count on the inflation pressure of the rolling assembly when the tyre is mounted on the rim and extender assembly.

Figure 4:
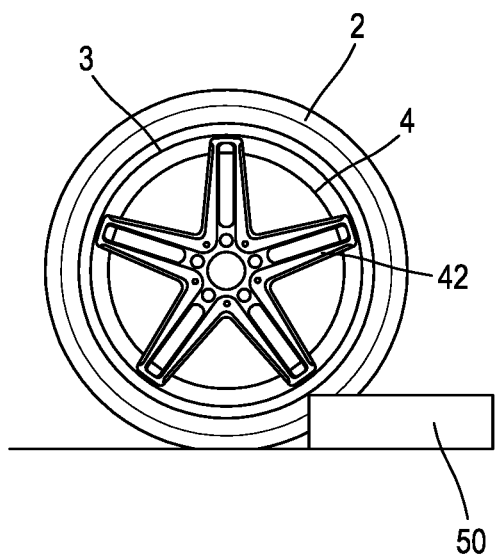
FIGS. 4 and 5 present a kerbing resistance test, in side view and top view, respectively.
Figure 5:
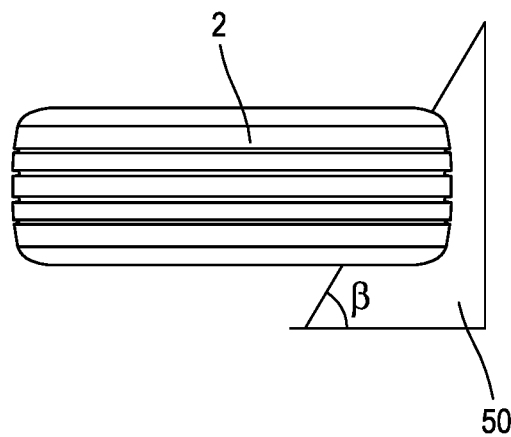

The kerbing resistance was measured by passing the rolling assemblies over a kerb 50 to 90 mm high with an angle β of 60° with respect to the direction of forward travel of the tyre (an angle of 90° corresponding to a direction perpendicular to the direction of forward travel of the tyre, see FIGS. 4 and 5); the edge of the kerb has a radius of curvature of 10 mm; successive passes are carried out at different speeds until the tyre loses its inflation pressure or until the tyre or the extender or the wheel deforms permanently and, on each pass, forces transmitted to the kerb and/or to the hub on the vehicle are acquired. A reference assembly is compared with an assembly according to the invention. The reference assembly T1 is a conventional assembly without an extender having a 245/35 R 20 tyre of the MICHELIN® PS4S type and a rim with a width of 8 inches, the flange being a J-type flange. As shown in FIG. 4, the wheels 4 of the rolling assemblies tested are wheels with spokes 42.

Four rolling assemblies having extenders were tested with variable values of the ratio SNUB:

The first E1, with a rim as shown in FIG. 3, has a ratio SNUB equal to 0.27;

The second E2, with a rim as shown in FIG. 7, has a ratio SNUB equal to 0.27;

The third E3, with a rim as shown in FIG. 7, has a ratio SNUB equal to 0.49; and The fourth E4, with a rim as shown in FIG. 7, has a ratio S/WB equal to 0.70.

Figure 6:
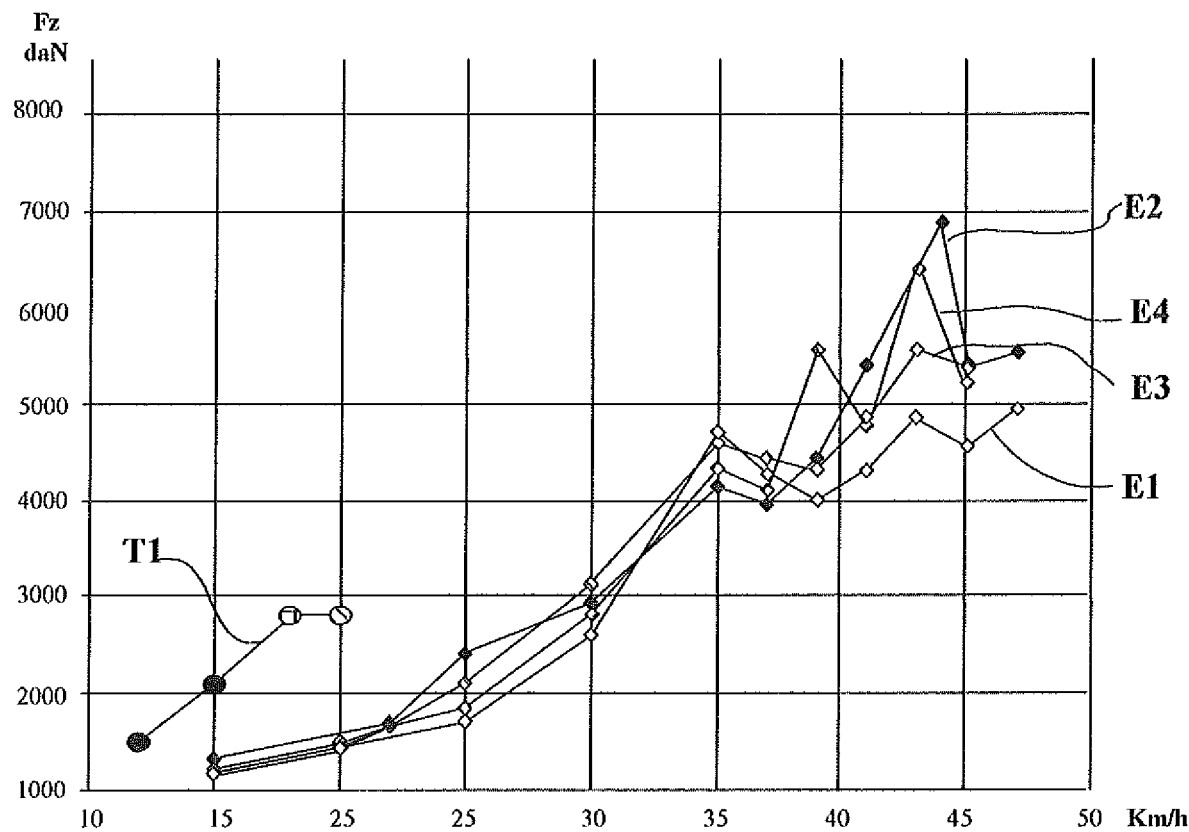
FIG. 6 presents performance results of rolling assemblies according to the invention in the kerbing test.

The results of the kerbing tests are presented in FIG. 6.

The graph in FIG. 6 presents the speed of forward movement of the tyre in km/h on the x-axis and the maximum value of the radial load measured at the ground during an impact expressed in daN on the y-axis.

The control rolling assembly T1 without extenders has a sidewall bulge from the test at 18 km/h and a puncture from 20 km/h.

For the four rolling assemblies having extenders, throughout the range of speeds tested, no tyre exhibits damage, even though the maximum speeds of the radial loads increase very substantially with the speed.

It should be noted that the maximum values of the radial loads are notably different depending on the location of the impact on the wheel. Fz is higher if the impact occurs at a spoke of the wheel compared with an impact between two spokes.

Therefore, it is not possible to differentiate the results for these four assemblies; it is noted, however, that the increase in the ratio S/WB does not lower the resistance of the rolling assembly to kerbing even though an increase in the radial loads appears to arise with the increase in the value of the ratio S/WB.

For the rolling assembly E1, a permanent deformation of the wheel at the location of the impact was noted from 42 km/h. The best resistance of the three other rolling assemblies according to the invention can be linked to the modification of the geometry of the rim flange and to the extension towards the outside of the rim flange.

By contrast, during behaviour tests, a substantial improvement in driving precision with the increase in the ratio SNUB was noted.

The invention claimed is:

1. An assembly comprising: a rim for a tire and two flexible extenders, the tire being mounted on the two flexible extenders, the two flexible extenders being mounted on the rim such that the tire is not in contact with the rim, the rim having an axis of rotation and having a pair of rim seats extended axially toward the outside by a rim flange, the rim flange having a radially outer bearing face with a first portion, that is oriented substantially in a perpendicular plane and is situated radially on the outside with respect to the rim seat, and a second portion, that is inclined toward the outside, situated axially on the outside with respect to the first portion, and situated at least partially radially on the outside with respect to the rim seat and a connecting portion between the first portion and the second portion, wherein the second portion is substantially frustoconical,
wherein the substantially frustoconical second portion is sloped to extend in an axially outward direction toward a rotational axis of the tire and extends to an axial edge of the rim, and wherein a virtual vertex determined by continuing the substantially frustoconical second portion is situated axially toward the outside with respect to the rim seat;

wherein each extender has an axially inner end configured to be mounted on the rim seat and an axially outer end and a body that is oriented substantially axially and disposed between the axially outer end and the axially inner end, wherein the body has a radially inner face, wherein the axially inner end of the extender has an axial positioning face substantially perpendicular to the axis of rotation and is fixed in place by being pressed axially against the rim flange under the effect of the inflation pressure of the rolling assembly, wherein the axially outer end of the extender has a shoulder forming, in part, a face substantially perpendicular to the axis of rotation, wherein each extender has an extender seat, wherein a bead of the tire has an axial width at the interface of the bead with the extender seat, and wherein the bead is fixed in place by being pressed axially against the axially outer end of the extender under the effect of the inflation pressure of the rolling assembly;

wherein the rim flange has an axial width, wherein the bead axial width and the rim flange axial width overlap each other, and wherein each of the flexible extenders defines a width and the rim flange axial width and the bead axial width are within the width of each of the flexible extenders.

2. The assembly according to claim 1, wherein the substantially frustoconical second portion forms an angle with a value of between 5° and 30° with the axis of rotation.

3. The assembly according to claim 1, wherein the substantially frustoconical second portion and the connecting portion have a cumulative axial width of between 15 mm and 21.5 mm.

4. The assembly according to claim 1, wherein the substantially frustoconical second portion forms an angle with a value of 15° with the axis of rotation.

5. The assembly according to claim 1, wherein the substantially frustoconical second portion and the connecting portion have a cumulative axial width of 18.3 mm.

* * * * *